(12) United States Patent
Ohrbom et al.

(10) Patent No.: US 7,122,605 B2
(45) Date of Patent: *Oct. 17, 2006

(54) METHOD FOR SELECTIVE GRAFT POLYMERIZATION

(75) Inventors: Walter H. Ohrbom, Hartland Township, MI (US); Patricia A. Herrel, Hartland Township, MI (US); John W. Rehfuss, Huntersville, NC (US)

(73) Assignee: BASF Corporation, Southfield, MI (US)

( * ) Notice: Subject to any disclaimer, the term of this patent is extended or adjusted under 35 U.S.C. 154(b) by 603 days.

This patent is subject to a terminal disclaimer.

(21) Appl. No.: 09/998,365

(22) Filed: Nov. 29, 2001

(65) Prior Publication Data

US 2003/0100687 A1    May 29, 2003

(51) Int. Cl.
C08F 283/01    (2006.01)
C08F 265/04    (2006.01)
C08F 8/32      (2006.01)

(52) U.S. Cl. .............. 525/498; 525/380; 525/484; 525/278; 525/327.2; 525/329.9; 525/332.7

(58) Field of Classification Search ............ 525/498, 525/380, 484, 278, 327.2, 329.9, 332.7
See application file for complete search history.

(56) References Cited

U.S. PATENT DOCUMENTS

| | | | |
|---|---|---|---|
| 4,882,391 A | 11/1989 | Brindöpke et al. | 525/327.2 |
| 5,187,229 A * | 2/1993 | Yamamoto et al. | 525/123 |
| 5,907,024 A | 5/1999 | Ohrbom et al. | |
| 5,945,499 A | 8/1999 | Ohrbom et al. | |
| 6,106,951 A | 8/2000 | Ohrbom et al. | |
| 6,376,616 B1 * | 4/2002 | December | 525/278 |
| 6,812,300 B1 * | 11/2004 | Ohrbom et al. | 525/498 |
| 2003/0050424 A1 | 3/2003 | Bernard | |
| 2003/0134986 A1 | 7/2003 | Ohrborn et al. | |

FOREIGN PATENT DOCUMENTS

| | | |
|---|---|---|
| DE | 2 293 454 | 12/1974 |
| EP | 0 380 146 | 6/1986 |
| EP | 0 274 721 | 12/1987 |
| FR | 2293454 | 12/1974 |
| GB | 1 095 485 | 12/1967 |
| GB | 1095485 | 12/1967 |
| WO | WO 97/23516 | 7/1997 |
| WO | WO 98/12233 | 3/1998 |
| WO | WO 98/50345 | 11/1998 |
| WO | WO 00/71505 | 11/2000 |
| WO | WO 03/060025 | 7/2003 |
| WO | WO 03/060026 | 7/2004 |

OTHER PUBLICATIONS

Copy of the International Search Report PCT/US 2002/26405, International filing date Aug. 20, 2002.
Notification of Transmittal of the International Search Report of the Declaration for PCT/US03/33976, International Filing Date Oct. 24, 2003.
International Search Report for PCT/US03/33976, International Filing Date Oct. 24, 2003.
English Language Abstract for EP 0 380 146.

* cited by examiner

Primary Examiner—James J. Seidleck
Assistant Examiner—Olga Asinovsky

(57) ABSTRACT

The invention relates to a method of making an acrylic graft polymer, especially a urethanized acrylic graft polymer. The method of the invention requires an ethylenically unsaturated monomer mixture (a) comprising a monomer (ai) of a particular structure having at least one cyclic carbonate group and the polymerization of the monomer mixture (a) under free radical polymerization conditions to make an acrylic backbone polymer (b) comprising one or more cyclic carbonate functional groups (bi). At least one grafting moiety (c) is then provided, said grafting moiety (c) comprising at least one amine group (ci) selected from primary amines, secondary amines, and mixtures of both primary and secondary amines. The grafting moiety (c) is then grafted onto acrylic backbone polymer (b) via reaction between the at least one amine group (ci) and cyclic carbonate functional groups (bi) so as to make an urethanized acrylic graft polymer.

12 Claims, No Drawings

METHOD FOR SELECTIVE GRAFT POLYMERIZATION

FIELD OF THE INVENTION

The invention relates to graft polymerization methods, especially to the graft polymerization of thermosetting functional acrylic graft polymers.

BACKGROUND OF THE INVENTION

Acrylic graft polymers have been known for use in the coatings industry as binders for thermosetting compositions. Acrylic graft polymer binders typically have a plurality of functional sites reactive with the functional sites of one or more crosslinking agents and upon cure, produce hard, durable, glossy films suitable for use in a variety of coating applications. Preferred applications include automotive primers, basecoats, and clearcoats. Such coatings may be waterborne, solventborne, powder, or combinations thereof.

The manufacture of acrylic graft polymers has typically involved the production of an acrylic backbone polymer having one or more functional sites per molecule. At least one of these functional sites must be capable of subsequent or concurrent reaction with at least one functional group of a graft moiety.

Graft copolymerization processes have traditionally been used to incorporate moieties that cannot be incorporated via the free radical polymerization of the acrylic backbone. Examples of such moieties include polymers such as polyesters, polyurethanes and the like, surfactants, halogenated compounds, certain water dispersible groups, especially nonionic groups, and simple alkyl groups.

However, numerous problems occur during such prior art graft copolymerization processes. In particular, in the processes of the prior art, the reaction of the graft moiety and the acrylic backbone polymer results in reaction products which are reactive with one or more species, including the acrylic backbone functionality, other intermediate species, and/or the graft moiety. Such undesirable side reactions result in uncontrolled molecular weight growth, the loss of desired functionality, and/or gellation.

In addition, the uncontrollable reactivity of the functional group used as the grafting site on the acrylic backbone limits the use of additional functionality on the acrylic backbone and hinders the production of multifunctional acrylic backbone polymers. As a result, it has been difficult to obtain certain multifunctional graft copolymers using the processes of the prior art.

For example, if an epoxy group is used as the grafting site on the acrylic backbone, ethylenically unsaturated monomers having functional groups reactive with epoxy must be avoided during the polymerization of the acrylic backbone if the epoxy group results from the use of an ethylenically unsaturated monomer such as glycidyl methacrylate. Illustrative functional groups that would have to be avoided include active hydrogen containing groups such as amine functional ethylenically unsaturated monomers, acid functional ethylenically unsaturated monomers, and depending on the polymerization conditions, hydroxy containing ethylenically unsaturated monomers.

Assuming that the acrylic backbone polymer's functionality is limited to epoxy groups, the use of amine, hydroxy, or acid functional graft moieties will result in a variety of intermediate species which are reactive with the graft moiety, the epoxy functionality of the acrylic backbone or both. As a result, attempts to use an amine or acid functional graft moiety will often lead to uncontrolled molecular weight growth, the loss of desired functionality on the backbone, and/or gellation.

It would thus be advantageous to provide a method of graft polymerization that would address the deficiencies of the prior art. In particular, what is desired is a method of graft polymerization that would facilitate the production of multifunctional graft acrylic polymers, especially multifunctional graft polymers wherein at least one functional group of the acrylic backbone polymer is hydroxyl. Such improved acrylic graft polymer manufacturing processes would have a decreased risk of uncontrolled molecular weight growth, the loss of desired acrylic backbone functionality, and/or gellation.

It is thus an object of the invention to provide a method of making multifunctional graft acrylic polymers and copolymers that eliminates the disadvantages of the prior art.

In particular, it is an object of the invention to provide a method of obtaining an acrylic graft polymer having at least two functional groups that would be reactive with each other under polymerization conditions. That is, the at least two functional groups would react with each other if incorporated via the free radical polymerization of at least two ethylenically unsaturated monomers having such functional groups.

It is another object of the invention to provide a method of making a urethanized acrylic graft polymer having at least one hydroxyl group.

Finally, it is an object of the invention to provide a method of making a urethanized acrylic graft polymer having at least one hydroxyl group and at least one functional group which is not hydroxyl and would be reactive with a hydroxyl group under free radical polymerization reaction conditions.

SUMMARY OF THE INVENTION

These and other objects have been achieved with the methods of the invention.

In one embodiment, the method of the invention requires an ethylenically unsaturated monomer mixture (a) comprising a monomer (ai) of a particular structure having at least one cyclic carbonate group and the polymerization of the monomer mixture (a) under free radical polymerization conditions to make an acrylic backbone polymer (b) comprising one or more cyclic carbonate functional groups (bi). At least one grafting moiety (c) is then provided, said grafting moiety (c) comprising at least one amine group (ci) selected from primary amines, secondary amines, and mixtures of both primary and secondary amines. The grafting moiety (c) is then grafted onto acrylic backbone polymer (b) via reaction between the at least one amine group (ci) and cyclic carbonate functional groups (bi) so as to make a urethanized hydroxyl functional acrylic graft polymer.

In another embodiment of the invention, the method of the invention requires an ethylenically unsaturated monomer mixture (a) comprising a monomer (ai) having at least one cyclic carbonate group and the structure

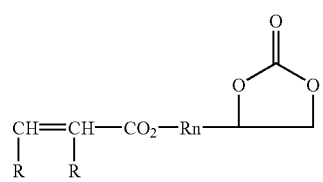

wherein R is hydrogen or a methyl group and Rn is an alkyl chain of from 1 to 4 carbons, and one or more additional ethylenically unsaturated monomers (aii) having functional groups which are unreactive with the cyclic carbonate functional groups of monomer (ai) under free radical polymerization conditions. The monomer mixture (a) is polymerized under free radical polymerization conditions to make an acrylic backbone polymer (b) comprising one or more cyclic carbonate functional groups (bi) and one or more functional groups (bii) which are unreactive with the cyclic carbonate groups (bi) under free radical polymerization conditions. At least one grafting moiety (c) is then provided, said grafting moiety (c) comprising at least one amine group (ci) selected from primary amines, secondary amines, and mixtures of both primary and secondary amines. The one or more functional groups (bii) are then reacted with one or more compounds (d) to provide a functional group (bii'), followed by reaction of the at least one amine group (ci) of the grafting moiety (c) with the cyclic carbonate functional groups (bi) to make a urethanized acrylic graft polymer.

In another embodiment of the invention, the reaction of the at least one amine group (ci) of the grafting moiety (c) with the cyclic carbonate functional groups (bi) makes a hydroxyl functional acrylic urethanized acrylic graft polymer and the hydroxyl group of the urethanized acrylic graft polymer is reacted with one or more compounds (e) to provide a multifunctional urethanized acrylic graft polymer.

DETAILED DESCRIPTION OF THE INVENTION

The method of the invention relates to the manufacture of acrylic graft polymers, especially urethanized, hydroxyl functional acrylic graft polymers, and most particularly to the manufacture of multifunctional urethanized acrylic graft polymers.

In one embodiment of the invention, the method of the invention requires the use of a monomer mixture (a) that is polymerized under free radical polymerization conditions to make an acrylic backbone polymer (b).

Monomer mixture (a) is comprised of ethylenically unsaturated monomers having at least one carbon-carbon double that is reactive with another carbon-carbon double bond under free radical polymerization conditions. 'Free radical polymerization conditions' as used herein refers to reaction conditions wherein the temperature is between room temperature (approximately 20° C./68° F.) and no more than 180° C./356° F., more preferably from 70 to 140° C./158 to 284° F., and most preferably from 110 to 140° C./230 to 284° F.

In a preferred embodiment of the invention, free radical polymerization as used herein refers to reaction conditions that are free of any catalysts which can activate an oxirane group. Illustrative examples of such oxirane activating catalysts are tertiary amine or quaternary salts (e.g., tetramethyl ammonium bromide), combinations of complex organic halides and alkyl phosphonium halides (e.g., $(CH_3)_3SnI$, $Bu_4SnI$, $Bu_4PI$, and $(CH_3)_4PI$), potassium salts (e.g., $K_2CO_3$, KI) in combination with crown ethers, tin octoate, calcium octoate, and the like.

Free radical polymerizations may take place in solvent or water but will most preferably take place in solvent. Illustrative examples of suitable organic solvents include aromatic solvents, ketone solvents, ester solvents, ether solvents, alcoholic solvents, and combinations thereof. In a preferred embodiment of the invention, free radical polymerization conditions as used herein refers to reaction conditions which are free of catalysts such as Lewis acids and strong sulphonic acids having a $pK_a$ of less than 2.0.

In a most preferred embodiment, free radical polymerization as used herein refers to temperatures of from 110 to 140° C./230 to 284° F., an absence of any epoxy ring activating catalysts, and an absence of any water or alcohols which are reactive with cyclic carbonate functional groups under such temperatures. In a most preferred embodiment, the free radical polymerization conditions will be such that a cyclic carbonate functional group remains inert.

In another embodiment of the invention, the method of the invention requires an ethylenically unsaturated monomer mixture (a) comprising a monomer (ai) having at least one cyclic carbonate group and the structure

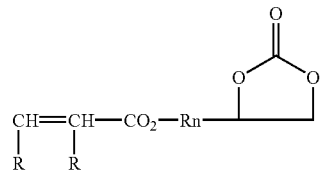

wherein R is hydrogen or a methyl group and Rn is an alkyl chain of from 1 to 4 carbons, and one or more additional ethylenically unsaturated monomers (aii) having functional groups which are unreactive with the cyclic carbonate functional groups of monomer (ai) under free radical polymerization conditions. The monomer mixture (a) is polymerized under free radical polymerization conditions to make an acrylic backbone polymer (b) comprising one or more cyclic carbonate functional groups (bi) and one or more functional groups (bii) which are unreactive with the cyclic carbonate groups (bi) under free radical polymerization conditions. At least one grafting moiety (c) is then provided, said grafting moiety (c) comprising at least one amine group (ci) selected from primary amines, secondary amines, and mixtures of both primary and secondary amines. The one or more functional groups (bii) are then reacted with one or more compounds (d) to provide a functional group (bii'), followed by reaction of the at least one amine group (ci) of the grafting moiety (c) with the cyclic carbonate functional groups (bi) to make a urethanized acrylic graft polymer.

Monomer (ai) will be present in monomer mixture (a) in an amount of from 1 to 100% by weight, based on the total weight of monomer mixture (a), more preferably from 5 to 70, and most preferably from 5 to 50, based on the total weight of monomer mixture (a).

Monomer (ai) can be prepared by the reaction of a glycidyl-group containing polymerization monomer with carbon dioxide to convert the oxirane group to a cyclic carbonate group. Examples of suitable oxirane group-containing polymerizable monomers include, without limitation, glycidyl acrylate, glycidyl methacrylate, glycidyl crotonate, and allyl glycidyl ether. Oxirane groups can be converted to carbonate groups by first converting to a cyclic carbonate group by reaction with $CO_2$. This can be done at any pressure from atmospheric up to supercritical $CO_2$ pressures, but is preferably under elevated pressure (e.g., 60–150 psi). The temperature for this reaction is preferably 60–150° C. Useful catalysts that activate the oxirane ring may be used. Illustrative catalysts include any that activate an oxirane ring, such as tertiary amine or quaternary salts (e.g., tetramethyl ammonium bromide), combinations of complex organic halides and alkyl phosphonium halides (e.g., $(CH_3)_3SnI$, $Bu_4SnI$, $Bu_4PI$, and $(CH_3)_4PI$), potassium salts (e.g., $K_2CO_3$, KI) preferably in combination with crown ethers, tin octoate, calcium octoate, and the like.

Monomer mixture (a) may further optionally comprise one or more additional ethylenically unsaturated monomers (aii) which are different from monomer (ai) and have one or more functional groups which are unreactive with the cyclic carbonate functional groups of monomer (ai) under free radical polymerization conditions. That is, under free radical polymerization conditions as defined above, the functional groups of monomers (aii) will not react with the cyclic carbonate group of monomer (ai). In a most preferred embodiment, monomer mixture (a) will comprise one or more monomers (aii).

Monomer (aii) will be present in monomer mixture (a) in an amount of from 0 to 99% by weight, based on the total weight of monomer mixture (a), more preferably from 30 to 95, and most preferably from 50 to 90, based on the total weight of monomer mixture (a).

Illustrative examples of such monomers (aii) include hydroxyl functional ethylenically unsaturated monomers, isocyanate functional ethylenically unsaturated monomers, carboxylic acid functional ethylenically unsaturated monomers, urea functional ethylenically unsaturated monomers, carbonate functional ethylenically unsaturated monomers and mixtures thereof, wherein ethylenically unsaturated monomers are as defined above. Preferred monomers (aii) are hydroxyl functional, acid functional, alkyl substituted, aryl substituted and isocyanate functional ethylenically unsaturated monomers Illustrative hydroxyl functional ethylenically unsaturated monomers (aii) are hydroxyalkyl esters of acrylic acid or methacrylic acid such as hydroxyethylmethacrylate, hydroxypropylmethacrylate and mixtures thereof, with hydroxyethylmethacrylate being most preferred.

Illustrative isocyanate functional ethylenically unsaturated monomers (aii) include meta-isopropenyl-alpha,alpha-dimethylbenzyl isocyanate and isocyanatoethyl methacrylate. Meta-isopropenyl-alpha,alpha-dimethylbenzyl isocyanate is most preferred.

Illustrative carboxylic acid functional ethylenically unsaturated monomers (aii) are acrylic acid, methacrylic acid and mixtures thereof, with methacrylic acid being preferred.

Suitable urea functional ethylenically unsaturated monomers (aii) include allyl urea.

Ethylenically unsaturated monomers having carbonate functionality in the ester portion of the monomer may also be used as monomer (aii). Such monomers are well known in the art and are described, for example, in U.S. Pat. Nos. 3,479,328, 3,674,838, 4,126,747, 4,279,833, and 4,340,497, the disclosures of which are hereby incorporated by reference. For example, one method of synthesis involves reaction of a hydroxy ester with urea to form the carbamyloxy carboxylate (i.e., carbonate modified acrylate). Another method of synthesis reacts an alpha,beta-unsaturated acid ester with a hydroxy carbonate ester to form the carbamyloxy carboxylate. Yet another technique involves formation of a hydroxyalkyl carbonate by reacting a primary or secondary amine or diamine with a cyclic carbonate such as ethylene carbonate. The hydroxy group on the hydroxyalkyl carbonate is then esterified by reaction with acrylic or methacrylic acid to form the carbonate functional monomer. Other methods of preparing carbonate modified acrylic monomers are described in the art and can be utilized as well.

Monomer mixture (a) may further optionally comprise one or more nonfunctional ethylenically unsaturated monomers (aiii). Illustrative nonfunctional monomers (aiii) include vinyl monomers such as styrene, alpha-methyl styrene, vinyl toluene, tert-butyl styrene, and 2-vinyl pyrrolidone and alkyl esters of acrylic acid and/or methacrylic acid. Illustrative examples of alkyl esters of acrylic acid and/or methacrylic acid include ethyl (meth)acrylate, butyl (meth)acrylate, 2-ethylhexyl(meth)acrylate, cyclohexyl (meth) acrylate, lauryl (meth)acrylate, isodecyl (meth)acrylate, methyl (meth)acrylate.

Monomer (aiii) will be present in monomer mixture (a) in an amount of from 0 to 99% by weight, based on the total weight of monomer mixture (a), more preferably from 30 to 95, and most preferably from 50 to 90, based on the total weight of monomer mixture (a).

Monomer mixture (a) will be polymerized under free radical polymerization conditions as defined above to provide an acrylic backbone polymer (b) having one or more cyclic carbonate functional groups (bi). Acrylic backbone polymer (b) may also comprise optional functional groups (bii) if monomer mixture (a) comprised optional monomers (aii).

The method of the invention further comprises the use of at least one grafting material (c). Grafting material (c) may be monomeric, oligomeric, or polymeric in nature. Grafting material (c) may be provided during the free radical polymerization of monomer mixture (a) or after, but will most preferably be provided after acrylic backbone polymer (b) is obtained. However, if grafting material (c) is provided during the free radical polymerization of monomer mixture (a) so that grafting occurs simultaneously with free radical polymerization, grafting material (c) must be free of any carbon-carbon double bonds which could polymerize when subjected to free radical polymerization conditions.

Grafting material (c) will be at least one compound comprising at least one amine group (ci) and at least one grafting moiety (cii). The at least one amine group (ci) of grafting material (c) will be at least one amine group that is selected from primary amines, secondary amines, and mixtures thereof.

Grafting material (c) may also comprise additional functional groups such isocyanate (blocked or unblocked), hydroxy, acid, carbonate, ethers, polyethers, amines not reactable with cyclic carbonate groups, and the like. In a preferred embodiment, grafting material (c) will comprise such functional groups in addition to at least one amine group (ci) and at least one grafting moiety (cii). In a most preferred embodiment, grafting moiety (c) will comprise said additional functional groups.

Grafting material (c) will also have a graft moiety (cii) which may be aliphatic, cycloaliphatic, and/or aromatic. The graft moiety (cii) may contain heteroatoms. Illustrative graft moieties (cii) are polyurethane oligomers and polymers, and monomers, oligomers and polymers containing carbonate groups, groups convertible to carbonate, surfactants, halogen-containing compounds, polyethers, polyoxyalkylene groups, polyalkyldienes, triazines, hindered amine light stabilizers (HALS), aromatic groups, and mixtures thereof. Examples of groups convertible to carbonate include hydroxy groups. Polyurethane polymers, hydroxy groups, and carbonate groups, especially primary carbonate groups, are most preferred for use as the graft moiety of graft material (c).

In a most preferred embodiment, if the at least one amine group (ci) is a primary amine, grafting moiety (cii) must have six or more carbons or have additional functional group such those discussed above.

Grafting material (c) will be provided in the method of the invention in an amount of from 10 to 120 equivalents, based on the total equivalents of cyclic carbonate functional monomer (ai). More preferably, grafting material (c) will be provided in the method of the invention in an amount of from 20 to 100, and most preferably from 50 to 100 equivalents, all based on the total equivalents of cyclic carbonate functional monomer (ai).

It will be appreciated that additional grafting material (c) may be added based on other functional groups present on acrylic backbone polymer (b). For example, grafting material (c) may be used to react with acid groups to provide water dispersible ionic groups.

If the grafting material (c) is not provided during the free radical polymerization of monomer mixture (a), grafting material (c) will be reacted with acrylic backbone polymer (b) under reaction conditions sufficient to react the amine group (ci) of grafting material (c) with the cyclic carbonate functional group (bi) of acrylic backbone polymer (b). Illustrative grafting reaction conditions are temperatures between 20 and 140° C./68 to 284° F., more preferably between 20 and 120° C./68 to 248° F., and most preferably between 20 and 80° C./68 to 176° F.

The reaction of the at least one amine group (ci) of the grafting material (c) and the cyclic carbonate group (bi) of the acrylic backbone polymer (b) results in the formation of a urethane group and a hydroxyl group beta to the urethane group. The urethane group links the grafting moiety (cii) with the acrylic backbone polymer (b).

In one embodiment of the invention, optional functional groups (bii) of acrylic backbone polymer (b) may be reacted with one or more optional compounds (d) to provide a functional group (bii'). The reaction between functional groups (bii) and optional compound (d) may occur before, during or after the reaction of grafting material (c) and acrylic backbone polymer (b). Most preferably, if optional functional groups (bii) are used as a precursor to desired functional group (bii'), such reaction will occur before the grafting reaction of compound (c) with acrylic backbone polymer (b). Functional group (bii) may thus act as a secondary-grafting site or as a precursor to a different functional group that was difficult to incorporate earlier.

Compound (d) may be monomeric, oligomeric, or polymeric in nature, with monomeric being most preferred. It will be appreciated that compound (d) must have at least one functional group reactive with optional functional group (bii).

In another embodiment of the invention some, all, or none of the hydroxyl groups formed from the reaction of the cyclic carbonate functional group (bii) and the amine group (ci) may be reacted with one or more compounds (e).

Compounds (e) may be monomeric, oligomeric, or polymeric in nature. Suitable compounds (e) include those compounds which have at least one functional group reactive with hydroxyl. In another embodiment, the one or more compounds (e) may comprise compounds or groups such as those described above in regards to grafting moiety (cii). It will therefore be appreciated that the hydroxyl group may act as a secondary-grafting site. Alternatively, the hydroxyl group may be converted into a different functional group that could not easily be introduced previously. For example, the hydroxyl group may be reacted with a mono- or polyisocyanate compound to provide an isocyanate functional urethanized acrylic graft polymer. Alternatively, the hydroxyl group may be converted into an acid group by reaction with a cyclic anhydride. Finally, the hydroxyl group may also be converted to a carbonate group by reaction with phosgene and ammonia.

It will therefore be appreciated that a grafting moiety (cii) will be incorporated via the amine ring opening of the cyclic carbonate functional group (bi), through reaction of compound (d) with optional functional groups (bii) or through reaction of compound (e) with the hydroxyl group. Multi-functionality may be incorporated into the urethanized acrylic graft polymers of the invention via reaction of the hydroxyl group resulting from said amine/cyclic carbonate reaction with compounds (e) or by the use of optional functional groups (bii) or by reaction of functional groups (bii) with compounds (d).

The use of the method of the invention provides an improved way to make multifunctional acrylic graft polymers that were not previously commercially feasible to manufacture.

For example, with the use of the method of the invention, urethanized acrylic graft polymers having blocked isocyanate or urethane containing groups and hydroxyl groups can be obtained. Isocyanate functional ethylenically unsaturated monomers can be polymerized under free radical conditions with the monomer (ai) of the invention. The isocyanate group can then be reacted with any material having at least one isocyanate functional group. This is followed by reaction of the cyclic carbonate with an amine functional graft material (c) to provide a hydroxyl group beta to the urethanized graft moiety. The resultant final acrylic graft polymer has significant urethane character as well as hydroxyl functionality.

In another example, acid functional ethylenically unsaturated monomers can be copolymerized with the monomer (ai) under free radical polymerization conditions. One or more amine functional graft materials (c) could then be used to impart water dispersability via the salting of the acid groups with the amine groups of (c). The same or different amine groups could be used to open the cyclic carbonate groups (bi) to obtain a water dispersible hydroxyl functional urethanized acrylic resin.

Acrylic graft polymers made by the method of the invention will generally have number average molecular weights of from 1,000 to 1,000,000 more preferably from 1,000 to 100,000, and most preferably from 1,000 to 10,000, based on a polystyrene standard using GPC.

It will also be appreciated that the acrylic graft polymers of the invention may be designed to have a wide range of hydroxyl and/or acid values. The acrylic graft polymers of the invention may be used in solventborne, waterborne or powder coating compositions.

The urethanized acrylic graft polymers of the invention are particularly suitable for use in automotive coating compositions, especially primers, basecoats, and/or clearcoats, with clearcoats being especially preferred.

Coating compositions comprising the urethanized acrylic graft polymer of the present invention preferably form the outermost layer or layer of coating on a coated substrate. Preferably, the instant coating compositions are applied over one or more layers of primer coatings. For example, the coating compositions of the invention may be used as an automotive topcoat coating applied over a layer of electrocoat primer and/or primer surfacer.

When such coating compositions are used as topcoat coatings, they preferably have a 20 degree gloss, as defined by ASTM D523-89, of at least 80 or a DOI, as defined by ASTM E430-91, of at least 80, or both. Such gloss and DOI are particularly useful in providing an automotive finish that will appeal to the buyer of the vehicle. Topcoat coatings may be one coat pigmented coatings or may be a color-plus-clear composite coating.

Coating compositions comprising the acrylic copolymer of the present invention, if used as a one coat pigmented coating or the color coating of a color-plus-clear composite coating, will include one or more pigments well-known in the art, such as inorganic pigments like titanium dioxide, carbon black, and iron oxide pigments, or organic pigments like azo reds, quinacridones, perylenes, copper phthalocyanines, carbazole violet, monoarylide and diarylide yellows, naphthol orange, and the like.

In a preferred embodiment, the coating composition of the present invention is the clearcoat of a color-plus-clear composite coating. The clearcoat may be applied over a color coat according to the invention or may, alternatively, be applied over a color coat of a formulation already known in the art. Pigmented color coat or basecoat compositions for such composite coatings are well-known in the art and do not require explanation in detail herein. Polymers known in the art to be useful in basecoat compositions include acrylics, vinyls, polyurethanes, polycarbonates, polyesters, alkyds, and polysiloxanes. Such basecoats may comprise the acrylic graft copolymer of the invention. Preferred polymers include acrylics and polyurethanes, especially the urethanized acrylic graft polymer of the invention. In one preferred embodiment of the invention, the basecoat composition also utilizes a carbonate-functional urethanized acrylic graft polymer of the invention.

Coating compositions comprising the acrylic graft polymer of the invention will be crosslinkable and will thus comprise one or more type of crosslinking agents having one or more crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful crosslinkable functional groups include hydroxy, epoxy, acid, anhydride, silane, and acetoacetate groups. Preferred crosslinking agents will have crosslinkable functional groups that include hydroxy functional groups and amino functional groups and isocyanate groups. Di- and/or polyisocyanates and/or aminoplast resins are most preferred for use as crosslinking agents in coating compositions comprising the acrylic graft polymer of the invention. Other mixed crosslinkers may also be used.

For example, basecoat coating compositions comprising the acrylic graft polymer of the invention will require a separate crosslinking agent that is reactive with the functional groups of the graft copolymer. When the polymer comprises hydroxy functional groups, for example, the crosslinking agent may be an aminoplast resin, a polyisocyanate and blocked polyisocyanate resin (including an isocyanurate, biuret, or the reaction product of a diisocyanate and a polyol having less than twenty carbon atoms), and an acid or anhydride functional crosslinking agent.

Other materials well-known to the coatings artisan, for example, surfactants, fillers, stabilizers, wetting agents, dispersing agents, adhesion promoters, UV absorbers, light stabilizers such as HALS, antioxidants, solvents, catalysts, and/or rheology control agents, may be incorporated into the coating composition. The amount of these materials used must be controlled to achieve the desired performance properties and/or to avoid adversely affecting the coating characteristics.

Coating compositions can be coated onto an article by any of a number of techniques well-known in the art. These include, for example, spray coating, dip coating, roll coating, curtain coating, and the like. For automotive body panels, spray coating is preferred. When the coatings will be relatively thick, they are usually applied in two or more coats separated by a time sufficient to allow some of the water and/or solvent evaporate from the applied coating layer ("flash"). The coats as applied are usually from 1 to 3 mils of the coating composition, and a sufficient number of coats are applied to yield the desired final coating thickness.

Where a color-plus-clear composite coating is applied to the prepared substrate, the color coat is usually applied in one or two coats, then allowed to flash, and the clear coat is then applied to the uncured color coat in one or two coats. The two coating layers are then cured simultaneously. Preferably, the cured base coat layer is 0.5 to 1.5 mils thick and the cured clear coat layer is 1 to 3 mils, more preferably 1.6 to 2.2 mils thick.

Coating compositions comprising the acrylic graft polymer of the invention are preferably subjected to conditions so as to cure the coating layers. Although various methods of curing may be used, thermal-curing is preferred. Generally, thermal curing is effected by exposing the coated article to elevated temperatures provided primarily by radiative heat sources. Curing temperatures will vary depending on the particular blocking groups used in the crosslinking agents, however they generally range between 93 degree C. and 177 degree C. In a preferred embodiment, the cure temperature is between 135 degree C. and 165 degree C. In another preferred embodiment, a blocked acid catalyst is included in the composition and the cure temperature is between 115 degree C. and 140 degree C. In a different preferred embodiment, an unblocked acid catalyst is included in the composition and the cure temperature is between 80 degree C. and 100degree C. The curing time will vary depending on the particular components used and physical parameters, such as the thickness of the layers. Typical curing times range from 15 to 60 minutes, and preferably 15–25 minutes at the target temperature.

EXAMPLES

Example 1

Preparation of an Acrylic Backbone Polymer (b) According to the Invention.

A solution of 29.96 parts of amyl acetate was heated under an inert atmosphere to reflux (~144° C./291° F.). The inert air was then turned off and a mixture of 6.13 parts of (2-Oxo-1,3-dioxolan-4-yl)methyl methacrylate, 18.4 parts of 2-hydroxyethyl methacrylate, 9.2 parts of styrene, 27.59 parts of 2-ethylhexyl methacrylate and 7.36 parts of a 50% solution of t-butylperacetate in odorless mineral spirits was added over three hours while keeping the system at reflux. Then 1.57 parts of amyl acetate was added. The resulting polymer had a Mn of 1868 Daltons, Mw of 3402 Daltons and a polydispersity of 1.82.

Example 2

Preparation of an Acrylic Graft Polymer According to the Invention.

70 parts of the acrylic backbone polymer of Example 1 was mixed at room temperature with 2.2 parts of aminopropanol and 30 parts of water. The resulting product had a Mn of 1901 Daltons, Mw of 3548 Daltons, and a polydispersity of 1.87. These results indicate the absence of unwanted side reactions.

Example 3

Preparation of an Acrylic Graft Polymer According to the Invention.

The reaction of Example 2 was repeated, except that hexyl amine was used in place of amino propanol. The resulting product had a Mw of 3491 Daltons. These results indicate the absence of unwanted side reactions.

Comparative Example 1 & 2

Preparation of an Acrylic Graft Polymer Outside the Invention.

An acrylic backbone polymer was made per the example of Example 1, except that glycidyl methacrylate was used in place of (2-Oxo-1,3-dioxolan-4-yl)methyl methacrylate. Per example 2, amino propanol was grafted onto the resulting acrylic backbone polymer. After reaction with amino propanol, the resulting resin had a Mn of 1383 Daltons, Mw of 3258 Daltons, and a polydispersity of 2.35, indicating the occurrence of a significant degree of unwanted branching.

Comparative Example 1 & 3

Preparation of an Acrylic Graft Polymer Outside the Invention.

The acrylic backbone polymer of Comparative Example 1 was used. Per Example 2, hexyl amine was grafted on the polymer. The resulting resin had a Mw of 7014 Daltons, indicating a significant degree of unwanted branching occurred.

We claim:

1. A method of making a hydroxyl functional urethanized acrylic graft polymer, comprising
providing an ethylenically unsaturated monomer mixture (a) comprising a monomer (ai) having at least one cyclic carbonate group and the structure

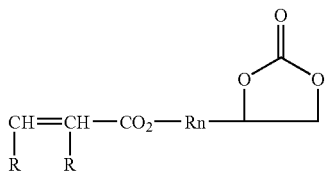

wherein Rn is a straight chain alkane of from 1 to 4 carbons, and R is H or $CH_3$,
polymerizing the monomer mixture (a) under free radical polymerization conditions to make an acrylic backbone polymer (b) comprising one or more cyclic carbonate functional groups (bi),
providing at least one grafting material (c), said grafting material (c) comprising one amine group (ci) selected from primary amines and secondary amines, and a grafting moiety (cii) selected from the group consisting of acid groups, polyurethane oligomers, polyurethane polymers, polyurethane monomers, carbamate containing polymers, carbamate containing oligomers, carbamate groups, surfactants, halogen containing compounds, ether groups, polyethers, amines not reactable with cyclic carbonate groups, polyoxyalkene groups, polyalkyldienes, triazines, hindered amine light stabilizers, blocked isocyanate groups, unblocked isocyanate groups, and mixtures thereof, and
reacting the one amine group (ci) of the grafting material (c) with the cyclic carbonate functional groups (bi) to make a hydroxyl functional urethanized acrylic graft polymer.

2. The method of claim 1 wherein the monomer mixture (a) further comprises one or more additional ethylenically unsaturated monomers (aii) having functional groups—which are unreactive with the cyclic carbonate functional groups of monomer (ai) under free radical polymerization conditions.

3. The method of claim 1 wherein monomer mixture (a) further comprises one or more nonfunctional ethylenically unsaturated monomers (aiii).

4. The method of claim 2 wherein the free radical polymerization occurs (1) in temperatures of no more than 180 degrees C., (2) in the absence of epoxy catalysts, and (3) in the absence of catalysts such as Lewis acids and sulphonic acids having a pKa of less than 2.0.

5. The method of claim 2 wherein the one or more ethylenically unsaturated monomers (aii) are selected from the group consisting of hydroxyl functional ethylenically unsaturated monomers, isocyanate functional ethylenically unsaturated monomers, carboxylic acid functional ethylenically unsaturated monomers, urea functional ethylenically unsaturated monomers, carbonate functional ethylenically unsaturated monomers, and mixtures thereof.

6. The method of claim 2 wherein the step of polymerizing monomer mixture (a) makes an acrylic backbone polymer (b) further comprising one or more functional groups (bii) which are unreactive with the cyclic carbonate groups (bi) under free radical polymerization conditions.

7. The method of claim 6 wherein the functional groups (bii) of acrylic backbone polymer (b) are selected from the group consisting of hydroxyl groups, isocyanate groups, epoxy groups, carboxylic acid groups, carbamate groups, urea groups, and mixtures thereof.

8. The method of claim 6 further comprising
reacting the one or more functional groups (bii) with one or more compounds (d) to provide a functional group (bii').

9. The method of claim 8 wherein said reaction between functional groups (bii) and compound (d) occurs before the reaction of the at least one amine group (ci) of the grafting material (c) with the cyclic carbonate functional groups (bi) to make an acrylic graft polymer.

10. The method of claim 1 further comprising reacting the hydroxyl group of the urethanized acrylic graft polymer with one or more compounds (e).

11. The method of claim 1 wherein the one amine group (ci) of grafting material (a) is a primary amine.

12. A hydroxyl functional urethanized acrylic graft polymer made by the method of claim 1.

* * * * *